US005676304A

United States Patent [19]

Matsui et al.

[11] Patent Number: 5,676,304

[45] Date of Patent: Oct. 14, 1997

[54] METHOD OF BONDING A CONTACT-TYPE THIN FILM MAGNETIC HEAD ELEMENT TO A SUPPORTING BEAM

[75] Inventors: Masaaki Matsui, 3-1 Kumada, Nagakute, Nagakute-cho, Aichi-gun, Aichi-ken; Toshiaki Sato, Kanagawa-ken; Shinya Ibuka, Tokyo; Seiichi Nagata, Aichi-ken, all of Japan

[73] Assignees: Masaaki Matsui; Nipponhatsujyo Kabushikikaisha; Daidotokushuko Kabushikikaisha, all of, Japan

[21] Appl. No.: 594,097

[22] Filed: Jan. 30, 1996

[30] Foreign Application Priority Data

Jan. 31, 1995 [JP] Japan .................................... 7-036177

[51] Int. Cl.$^{6}$ ........................................ G11B 5/31

[52] U.S. Cl. ........................................ 228/110.1

[58] Field of Search .............................. 228/110.1, 179.1, 228/193; 360/123

[56] References Cited

U.S. PATENT DOCUMENTS 4,760,481 7/1988 Yuito et al. ............................ 360/123

4,796,132 1/1989 Dekura et al. .......................... 360/113

5,576,098 11/1996 Arimoto et al. ........................ 428/332

OTHER PUBLICATIONS

English Language Summary of JP–6–150250 (31–5–1994) "Thin Film Magnetic Head and its Manufacture".

English Language Summary of JP–6–150251 (31–5–1994) "Contact Type Magnetic Head".

*Primary Examiner*—Samuel M. Heinrich

*Attorney, Agent, or Firm*—William A. Drucker

[57] ABSTRACT

A method of bonding a contact-type thin film magnetic head element to a beam for supporting the head element in a contact-type thin film magnetic head during a process of producing the magnetic head is disclosed. A connecting pad of the magnetic head element is made contact with a signal conductor of the supporting beam. Then, a vibration energy of an ultrasonic wave is applied to the contact portion so that the surfaces of the components in the contact portion are caused to diffuse into each other. As a result, a state in which the connecting pad is mechanically coupled and electrically connected to the signal conductor is obtained.

1 Claim, 2 Drawing Sheets

METHOD OF BONDING A CONTACT-TYPE THIN FILM MAGNETIC HEAD ELEMENT TO A SUPPORTING BEAM

TECHNICAL FIELD

The invention relates to a method of bonding a contact-type thin film magnetic head element to a beam for supporting the head element in a contact-type thin film magnetic head during a process of producing the magnetic head.

BACKGROUND ART

A contact-type thin film magnetic head is used in the manner shown in FIG. 3. Referring to FIG. 3, 1 designates a magnetic disk, and 2 designates a supporting arm which supports a magnetic head and has a basal portion 2*a* connected to an actuator for moving the head. The reference numeral 3 designates the contact-type thin film magnetic head which is attached to the tip portion of the supporting arm 2, 4 designates a supporting beam in a magnetic head 3 and the beam is elastic and has a basal portion 4*a* attached to the supporting arm 2, 5 designates a contact-type thin film magnetic head element which is disposed at the tip portion of the supporting beam 4, and 6 designates a contact tip of the head element 5. The contact face 6*a* of the contact tip 6 is caused to contact with the surface la of the magnetic disk 1 by the elasticity of the supporting beam 4 (for example, Japanese Published Unexamined Patent Application No. 6-150251).

In the contact-type thin film magnetic head 3 having such a structure, it is important to make the contact face 6*a* contact with the disk surface 1*a* with a predetermined contact pressure. In order to realize this, it is necessary for the dimension L shown in FIG. 4 between a reference face 4*b* of the supporting beam 4 and the contact face 6*a* to be highly accurate. The reference face 4*b* is a face for conducting attachment of the basal portion 4*a* of the supporting beam 4 to the supporting arm 2. The dimension L is a dimension obtained when the supporting beam 4 is in the free state or in a state where no urging force is applied to the beam as shown in FIG. 4.

In order to reduce the production cost, the magnetic head 3 is produced by the steps of separately producing the supporting beam 4 and the head element 5, and bonding the head element 5 to the supporting beam 4.

Consequently, the process of bonding the head element 5 to the supporting beam 4 is conducted in the manner such as shown in FIG. 5. Referring to FIG. 5, the supporting beam 4 has a structure in which three layers: a base 7 configured by, for example, a stainless steel spring plate; an insulating layer 8; and signal conductors 9 made of, for example, copper are integrally stacked. The base 7 and the signal conductors 9 contribute to the resilience of the supporting beam 4. The head element 5 comprises connecting pads (also called connecting portions, bonding pads, or the like) 10 for performing mechanical and electrical connections of the element to the signal conductors. The connecting pads 10 are connected to a coil in the head element. The bonding of the head element 5 to the supporting beam 4 is realized by adhering the connecting pads 10 to the signal conductors 9 by means of a conductive adhesive agent 11 (for example, Japanese Published Unexamined Patent Application No. 6-274829). In this bonding method, the mechanical coupling and electrical connection of the connecting pads 10 to the signal conductors 9 can be simultaneously conducted, and hence it is expected that the working efficiency is improved.

In the prior art method of bonding a contact-type thin film magnetic head element to a supporting beam, however, the adhesive agent 11 is interposed between the signal conductors 9 and the connecting pads 10. When the amount of the adhesive agent varies, therefore, also the thickness T1 varies. This variation lowers the accuracy of the dimension L. The bonding operation necessitates a period required for solidification of the adhesive agent so that working efficiency of the bonding operation is lowered.

The bonding may be conducted by means of soldering (for example, Japanese Published Unexamined Patent Application No. 6-150250). In the case where this means is employed, however, solder is interposed between the signal conductors 9 and the connecting pads 10. The variation in thickness of the solder lowers the accuracy of the dimension L. Furthermore, the heat applied during the soldering process is transmitted to the portions of the signal conductors 9 other than the bonding portions and impairs their elasticity. The heat is transmitted also to the head element 5 through the connecting pads 10. Since the head element 5 is produced by the thin film forming technique, the head element is easily affected by heat. Consequently, there arises a fear that the heat impairs the magnetic properties of the head element 5.

SUMMARY OF THE INVENTION

The method of bonding a contact-type thin film magnetic head element to a supporting beam according to the invention is provided in order to solve the problems of the prior art.

It is a first object to enable a mechanical coupling and electrical connection of a connecting pad of a head element to a signal conductor of a supporting beam to be simultaneously conducted.

It is a second object to, in order to improve the accuracy of the dimension between a reference face of the supporting beam and a disk contact face of the head element, enable the connecting pad to be directly bonded to the connecting pad.

It is a third object to enable the bonding to be conducted without adversely affecting the signal conductor and the head element by heat.

It is a fourth object to enable the bonding to be conducted very rapidly.

The method of bonding a contact-type thin film magnetic head element to a supporting beam according to the invention is a method in which a connecting pad for mechanical and electrical connections in the contact-type thin film magnetic head element is bonded to a signal conductor in the supporting beam, and which comprises the steps of: contacting the connecting pad with the signal conductor; and applying a vibration energy of an ultrasonic wave to the contact portion between the two components, thereby causing the surfaces of the components in the contact portion between the components to diffuse into each other.

According to the invention, when a head element is to be bonded to a supporting beam, a connecting pad for mechanical and electrical connections in the head element is bonded to a signal conductor of the supporting beam. Consequently, the invention can attain an effect that a mechanical coupling and electrical connection of the head element to the supporting beam are conducted simultaneously and with a high efficiency.

In the bonding of a head element to a supporting beam, a connecting pad is contacted with a signal conductor, and the contact portion between the two components is subjected to bonding by an ultrasonic wave energy. That is, there is a feature that a connecting pad can be directly bonded to a signal conductor. This eliminates interposition of another substance such as a conductive adhesive agent or solder between the two components which interposition is done in the prior art. As a result, the invention attains an effect that the accuracy of the dimension between a reference face of the supporting beam and a disk contact face of the head element can be increased to a very high level.

In the bonding, the energy of an ultrasonic wave is locally applied only to the contact portion between the signal conductor and the connecting pad, and hence the quantity of heat to be supplied is very small. Consequently, the portions of the signal conductor and the head element other than the contact portion are prevented from being raised in temperature, thereby attaining an effect that the properties are prevented from being impaired by heat due to the bonding.

Since the contact portion is caused to diffuse by locally applying an ultrasonic wave energy to only the contact portion as described above, the diffusion can be immediately stopped by halting the application of the ultrasonic wave. This can attain an effect that the bonding operation can be conducted very rapidly so as to improve the bonding efficiency.

Other object and advantages of the invention will become apparent during the following discussion of the accompanying drawings.

DESCRIPTION OF THE PREFERRED EMBODIMENT

Figure 1:
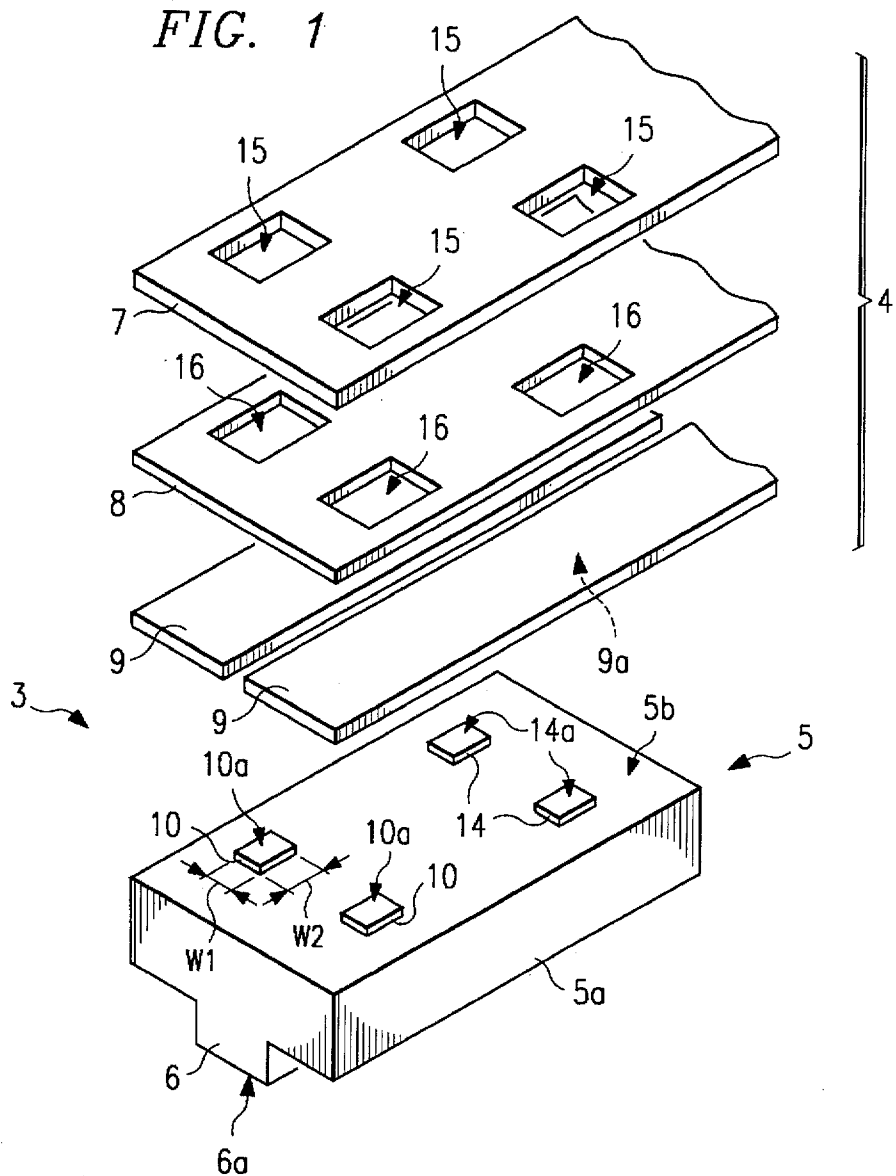
FIG. 1 is an exploded perspective view showing relationships between a supporting beam and a contact-type thin film magnetic head element.
Figure 2:
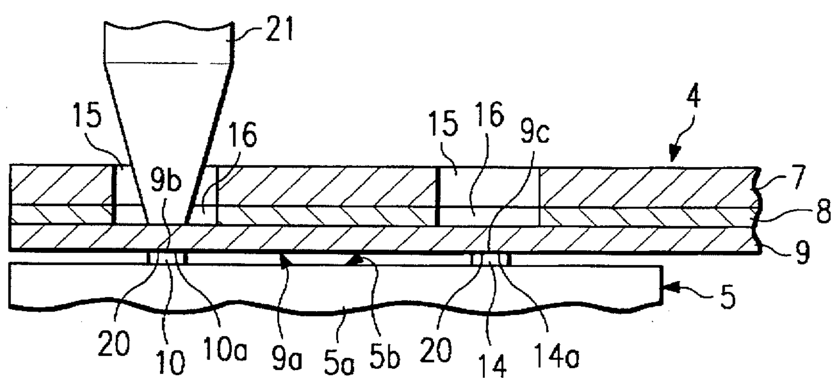
FIG. 2 is a section view showing a state where a connecting pad is to be bonded to a signal conductor.
Figure 3:
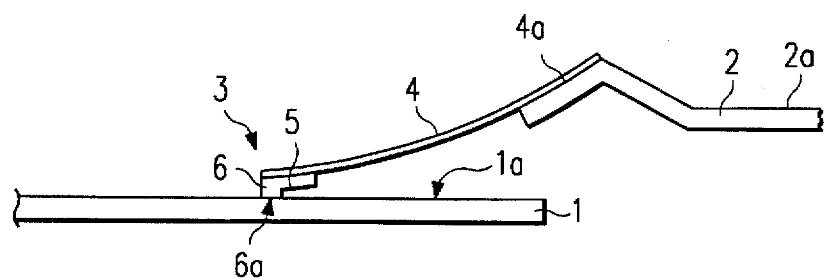
FIG. 3 is a partial view showing a use state of the contact-type thin film magnetic head.
Figure 4:
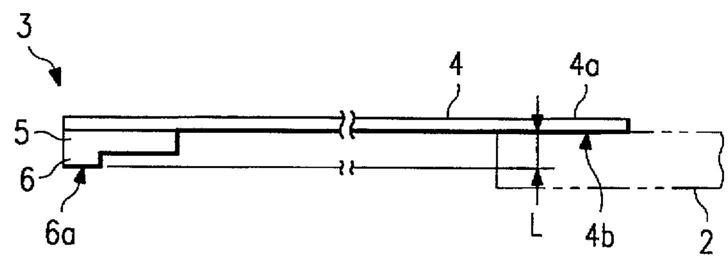
FIG. 4 is an enlarged view of the contact-type thin film magnetic head.
Figure 5:
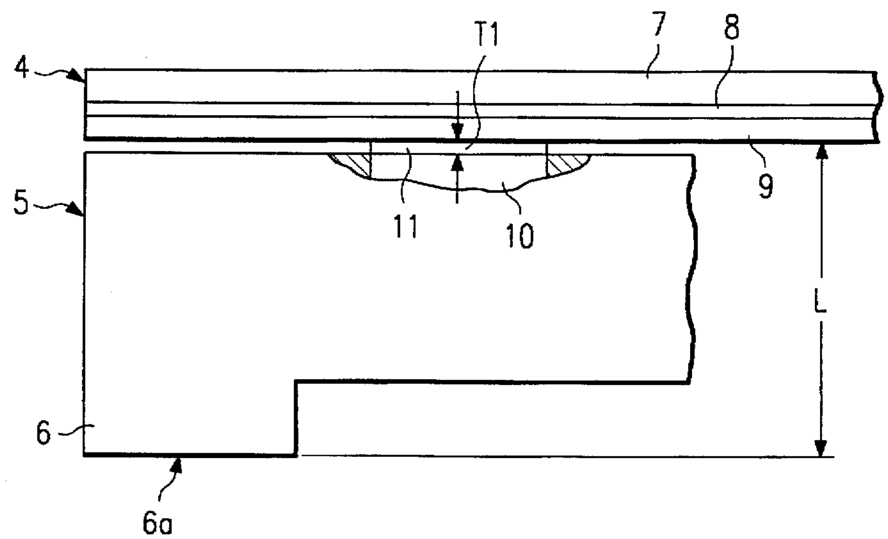
FIG. 5 is a partial cutaway view showing a bonding state in the prior art.

Hereinafter, FIGS. 1 and 2 showing an embodiment of the invention will be described. In the figures, the same reference numerals as those of FIGS. 3 to 5 designate functionally equivalent components and their description may be duplicated. Therefore, the duplicated description is omitted. Referring to the figures, both the length and width W1 and W2 of the connecting pads 10 of the head element 5 have a dimension of, for example, about 75 μm. The upper face 10*a* of each connecting pad 10 serves as a bonding face in the bonding which will be described later. In order to allow the upper faces 10*a* to surely contact with the signal conductors 9, the upper faces 10*a* are slightly protruded with respect to the upper face 5*b* of a structural body 5*a* of the head element 5. The upper faces 10*a* are configured by a material which is hardly oxidized, such as gold so that the surface control is facilitated (the formation of an oxide film is suppressed). For example, the upper face 10*a* configured by gold may be realized by forming the whole of the connecting pad 10 by gold. Alternatively, the upper face may be provided with gold by plating or forming a thin film on the connecting pad 10 made of another material. The reference numeral 14 designates auxiliary pads which are disposed in an auxiliary manner in order to further strengthen the mechanical coupling of the head element 5 to the supporting beam 4. The auxiliary pads 14 are configured in the same manner as the connecting pads 10 except that no electrical connection is formed in the head element 5.

The portions at 15 in the base 7 of the supporting beam 4 are through holes which are formed so as to allow the tip end of an ultrasonic presser to pressingly contact with the signal conductors 9 without touching the base 7. The through holes 15 are formed at positions corresponding to the connecting pads 10 and the auxiliary pads 14 of the head element 5, respectively. In order to suppress the lowering in strength of the base 7, the through holes 15 are preferably formed so as to have a size which is as small as possible but in the range where the ultrasonic presser is prevented from contacting with the base. The reference numeral 16 designates through holes which are formed in the insulating layer 8 with the same object as that of the through holes 15. The reference numeral 9*a* designates a face of each signal conductor 9 of the supporting beam 4 on the side of the signal conductor where the signal conductor is to be bonded to the pads 10 and 14. Each face 9*a* is formed by gold with the same object as that of the upper faces 10*a*.

Next, the operation of bonding the head element 5 to the supporting beam 4 will be described. At first, the supporting beam 4 and the head element 5 are supported by respective jigs. The jigs are then operated so that, as shown in FIG. 2, the bonding faces 10*a* and 14*a* of the connecting pads 10 and the auxiliary pads 14 of the head element 5 contact in a stacked manner with predetermined bonding portions 9*b* and 9*c* of the faces 9*a* of the signal conductors 9. This contact in a stacked manner is performed in order that the mutual diffusion of the faces 9*a* and the faces 10*a* and 14*a* is appropriately performed. In the contact, the bonding faces 10*a* and 14*a* are caused to surely contact with the faces 9*a* because the bonding faces are protruded. As shown in FIG. 2, the tip of an ultrasonic presser 21 is then made contact with the upper face of one of the signal conductors 9 via the through holes 15 and 16 and pressed against the upper face with a predetermined contact pressure. The ultrasonic presser 21 is a part of an ultrasonic machine which is used for transmitting ultrasonic vibration generated by an ultrasonic transducer to a workpiece. For example, the tip end face of the ultrasonic presser 21 has a rectangular shape in which one edge is equal to or shorter than about 100 μm. Alternatively, the end face may have a circular shape the diameter of which is equal to or shorter than about 100 μm. Then, an ultrasonic wave energy is applied to the contact portion 20 between the face 9*a* of the signal conductor 9 and the upper face 10*a* of the connecting pad 10. Specifically, the ultrasonic transducer is operated at a predetermined output power under the above-mentioned pressed state so that ultrasonic vibration is given from the ultrasonic presser 21 to the contact portion through the signal conductor 9. Then the faces 9*a* and 10*a* of the contact portion 20 are caused to diffuse into each other by the ultrasonic wave energy. When the application of the ultrasonic wave from the ultrasonic presser 21 is then halted, the diffusion is stopped. This stop of the diffusion causes the contact portion 20 to which the ultrasonic wave energy has been applied, to be instantaneously bonded to each other. This enables the bonding operation to be rapidly conducted. As a result of the bonding, the state is obtained in which the connecting pad 10 is mechanically coupled and electrically connected to the signal conductor 9. In this case, the ultrasonic wave energy is given to the contact portion 20 through only the signal conductor 9, and hence the diffusion occurs in a very restricted area, or only in the contact portion 20. Even when a small amount of an ultrasonic wave energy is given, therefore, gold in the faces 9*a* and 10*a* of the contact portion can surely diffuse, with the result that the bonding can be surely performed. Since the contact portion 20 is bonded by applying an ultrasonic wave energy through only the signal conductor 9, furthermore, the generation of heat is restricted only to the contact portion 20 so that there is little temperature rise in the portions of the signal conductor 9 and the interior of the head element 5 other than the contact portion 20. Consequently, the properties of the signal conductor and the head element are prevented from being impaired. In order to ensure an adequate bonding state, preferably, the output power of the ultrasonic presser 21 and the period which is to elapse until the stop of the output are previously determined in accordance with results of tests which are conducted with using samples of the supporting beam 4 and the head element 5. The bonding is then conducted also on the other connecting pad 10 and the auxiliary pads 14. When the operations of bonding all the connecting pads 10 and the auxiliary pads 14 are ended, the supporting beam 4 and the head element 5 are detached from the jigs, thereby completing the bonding of the head element 5 to the supporting beam 4.

In the bonding described above, the connecting pads 10 and the auxiliary pads 14 are directly bonded to the signal conductors 9, and hence reduction of dimensional accuracy due to interposition of another substance between the two components does not naturally occur. In the completed head 3 which are obtained after the bonding, therefore, the dimension L (see FIG. 4) between the reference face 4*b* and the contact face 6*a* is highly accurate.

The upper faces 10*a* and 14*a* of the connecting pads 10 and the auxiliary pads 14 of the head element 8 may be configured so as to be equal in level to or slightly lower than the upper face 5*b* of the structural body 5*a*. In this case, the predetermined bonding portions 9*b* and 9*c* of the faces 9*a* of the signal conductors 9 to which the pads are to be bonded are formed so as to be protruded, thereby enabling the faces 9*a* and the faces 10*a* and 14*a* to contact with each other.

As many apparently widely different embodiments of this invention may be made without departing from the spirit and scope thereof, it is to be understood that the invention is not limited to the specific embodiments thereof except as defined in the appended claims.

What is claimed is:

1. A method of bonding a contact-type thin film magnetic head element to a supporting beam in which a connecting pad for mechanical and electrical connections in said contact-type thin film magnetic head element is bonded to a signal conductor in said supporting beam, said method comprising the steps of:

contacting said connecting pad with said signal conductor; and applying a vibration energy of an ultrasonic wave to a contact portion between said two components, thereby causing surfaces of said components in said contact portion between the components to diffuse into each other.

* * * * *